United States Patent
Baekelmans et al.

(10) Patent No.: US 7,117,113 B1
(45) Date of Patent: Oct. 3, 2006

(54) AUTOMATED DATA COLLECTION AND ANALYSIS

(75) Inventors: John Baekelmans, Kontich (BE); Thibaut Vos, Wuustwezel (BE)

(73) Assignee: Cisco Technology, Inc., San Jose, CA (US)

(*) Notice: Subject to any disclaimer, the term of this patent is extended or adjusted under 35 U.S.C. 154(b) by 39 days.

(21) Appl. No.: 10/791,568

(22) Filed: Mar. 1, 2004

(51) Int. Cl.
G06F 19/00 (2006.01)

(52) U.S. Cl. ........................... 702/123; 702/189

(58) Field of Classification Search .............. 702/62, 702/123, 122, 182–188; 709/224, 223, 238; 706/45–47
See application file for complete search history.

(56) References Cited

U.S. PATENT DOCUMENTS

| | | | |
|---|---|---|---|
| 5,161,110 A * | 11/1992 | Dorchak | 700/108 |
| 5,758,154 A | 5/1998 | Qureshi | |
| 6,040,834 A | 3/2000 | Jain et al. | |
| 6,047,279 A | 4/2000 | Barrack et al. | |
| 6,360,255 B1 | 3/2002 | McCormack et al. | |
| 6,598,183 B1 | 7/2003 | Grieco et al. | |
| 6,633,833 B1 * | 10/2003 | Sharma et al. | 702/188 |
| 6,662,017 B1 | 12/2003 | McCann et al. | |
| 6,662,192 B1 | 12/2003 | Rebane | |
| 6,668,281 B1 | 12/2003 | Ayyadurai | |
| 6,690,788 B1 | 2/2004 | Bauer et al. | |
| 6,701,324 B1 | 3/2004 | Cochran et al. | |
| 6,718,337 B1 | 4/2004 | Klein et al. | |
| 6,751,661 B1 | 6/2004 | Geddes | |
| 6,754,707 B1 | 6/2004 | Richards et al. | |
| 6,772,178 B1 | 8/2004 | Mandal et al. | |
| 2003/0009465 A1 * | 1/2003 | Brown et al. | 707/100 |

OTHER PUBLICATIONS

Dennis Drogseth, "The New Management Landscape," *Packet, Cisco Systems Users Magazine*, Third Quarter 2002, pp. 29-60.
IBM, Cisco Systems, Inc., "Adaptive Services Framework," Version 1.00, Oct. 14, 2003, pp. 1-66.

* cited by examiner

*Primary Examiner*—Marc S. Hoff
*Assistant Examiner*—Janet Robbins
(74) *Attorney, Agent, or Firm*—Hickman Palermo Truong & Becker LLP

(57) ABSTRACT

Techniques are provided for automated data collection and analysis, including steps of receiving a request for information about a device; constructing a command set, wherein the command set is a set of executable commands that indicate collection of data from the device and zero or more other devices; sending the command set to the device; receiving analysis results from an analysis engine, wherein the analysis results are based at least in part on a set of results received from the device and produced by executing the command set; and determining a set of solutions based on the analysis results. Techniques are also provided for automated data collection and analysis, including the steps of sending a request for information about a device; receiving a command set in response to the request, wherein the command set is a set of executable commands that indicate collection of data from the device and zero or more other devices; executing the command set; generating a result set based on the execution of the command set; sending the result set to an analysis engine as part of a second request for analysis of the result set; and receiving a solution to one or more problems discovered at least in part by the analysis engine.

17 Claims, 3 Drawing Sheets

AUTOMATED DATA COLLECTION AND ANALYSIS

CROSS-REFERENCE TO RELATED APPLICATIONS

This application is related to U.S. patent application Ser. No. 10/714,158, filed Nov. 13, 2003, entitled "Rule-Based Network Management Approaches", of Keith Sinclair, et al., ("Sinclair"), the entire contents of which is hereby incorporated by reference for all purposes as if fully set forth herein.

FIELD OF THE INVENTION

The present invention generally relates to troubleshooting a computing device. The invention relates more specifically to automated data collection and analysis.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The difficulty in troubleshooting network elements such as routers, switches, computers, and other electronic devices is exacerbated by the difficulty in obtaining accurate data from the devices when they are installed in customer or end user networks or systems. One approach to obtaining accurate data that may be used by a vendor of the network elements is having a customer service engineer (CSE) attempt to connect to a device and obtain the data directly from the device. A problem with this approach is that it is often difficult or impossible for a CSE to connect to the device. For example, if the device is behind a firewall and the CSE is outside the protected network that is owned or operated by the end user, then the firewall will have to be temporarily reconfigured to allow the CSE to bypass the firewall.

Another approach is to have end users collect data for themselves. The approach overcomes the need for a CSE to have access to a device. A problem with this approach, however, is that it requires the end user to have expertise in connecting to the device and collecting data from the device. Another problem with this approach is that data will often need to be collected over a period of time or from multiple devices simultaneously, and end users will need great diligence and expertise in order to collect the data at the precise intervals needed. Yet another problem with this approach is that the end user may not have the expertise to collect the correct data. Without the correct data the problems with the devices cannot be solved.

Another problem with both approaches is that the CSE uses personal knowledge to detect problems with the device based on the collected data. The problem with the use of personal knowledge to solve the problems is that the process takes too much time and does not utilize the collective knowledge of the entire team of CSEs and other experts.

Based on the foregoing, there is a clear need for a solution that does not require a CSE to connect to a device; does not require end user expertise in connecting to and collecting data from the device; does not require diligence and expertise in order to collect the correct data at the precise intervals needed; and does not constrain the solution of device problems to the knowledge and available time of a particular CSE.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
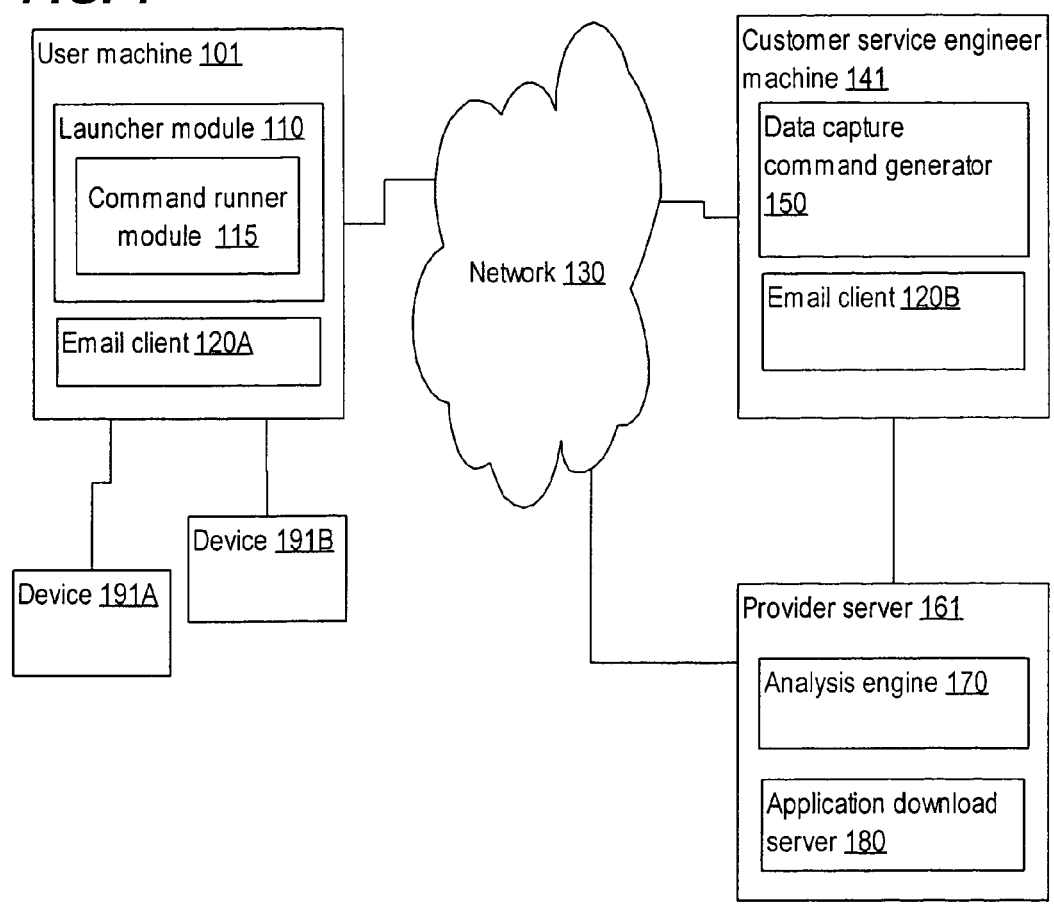
FIG. 1 is a block diagram that depicts an example system for automated data collection and analysis according to one embodiment of the invention.

A method and apparatus for automated data collection and analysis is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural Overview
3.0 Functional Overview
4.0 Hardware Overview
5.0 Extensions and Alternatives 1.0 General Overview The needs identified in the foregoing Background, and other needs and objects that will become apparent for the following description, are achieved in the present invention, which includes, in one aspect, techniques for automated data collection and analysis, including the machine-implemented steps of receiving a request for information about a device; constructing a command set, wherein the command set is a set of executable commands that indicate collection of data from the device and zero or more other devices; sending the command set to the device; receiving analysis results from an analysis engine, wherein the analysis results are based at least in part on a set of results received from the device and produced by executing the command set; and determining a set of solutions based on the analysis results.

In a related feature, the command set includes one or more commands to collect data from two or more devices simultaneously. In a related feature, the command set includes a first command to collect data from the device at a first time, and a second command to collect data from the device at a second time, wherein the first time is different from the second time.

In a related feature, the techniques further include the step of removing confidential information from the result set. In a related feature, the techniques further include the step of producing the analysis results based on a result set, where the result set is based at least in part on the execution of the command set. In a related feature, the techniques further include the step of providing the set of solutions to the user.

In a related feature, the step of constructing the command set includes choosing one or more commands from a list of predefined commands. In a related feature, the step of choosing one or more commands from the list of predefined commands includes choosing one or more commands based at least in part on the request for information about the device. In a related feature, the step of constructing the command set includes defining new commands based on the request for information about the device.

In another aspect, techniques are provided for automated data collection from a network device and analysis of the data, the method comprising the machine-implemented steps of receiving a request for information about the network device; constructing a command set, wherein the command set is a set of executable commands that indicate collection of data from the network device and zero or more other network devices; sending the command set for execution at the network device; receiving analysis results from an analysis engine, wherein the analysis results are based at least in part on a set of results received from the network device and produced by executing the command set; and determining a set of solutions based on the analysis results.

In another aspect, a machine-readable medium is provided for carrying one or more sequences of instructions for automated data collection and analysis, which instructions, when executed by one or more processors, cause the one or more processors to carry out the techniques described herein.

In another aspect, an apparatus is provided for automated data collection and analysis, including means for carrying out the techniques described herein.

In another aspect, an apparatus for automated data collection and analysis, including a network interface that is coupled to the data network for receiving one or more packet flows therefrom; a processor; one or more stored sequences of instructions which, when executed by the processor, cause the processor to carry out the steps described herein.

In another aspect, techniques are provided for automated data collection and analysis, the method including the machine-implemented steps of sending a request for information about a device; receiving a command set in response to the request, wherein the command set is a set of executable commands that indicate collection of data from the device and zero or more other devices; executing the command set; generating a result set based on the execution of the command set; sending the result set to an analysis engine as part of a second request for analysis of the result set; and receiving a solution to one or more problems discovered at least in part by the analysis engine.

In a related feature, the steps are performed by a command runner module running on a user machine, and wherein the method further includes the step of determining whether the user machine has the latest version of the command runner module.

In a related feature, the techniques further include the step of downloading the command runner module, if the user machine does not have a version of the command runner module. In a related feature, the techniques further include the step of downloading a patch to the command runner module, if the user machine does not have the latest version of the command runner module. In a related feature, the techniques further include the step of removing confidential information from the result set.

In another aspect, techniques are provided for automated data collection and analysis from one or more network devices, the method including the machine-implemented steps of sending a request for information about a network device; receiving a command set in response to the request, wherein the command set is a set of executable commands that indicate collection of data from the network device and zero or more other network devices; executing the command set; generating a result set based on the execution of the command set; sending the result set to an analysis engine as part of a second request for analysis of the result set; and receiving a solution to one or more problems discovered at least in part by the analysis engine.

2.0 Structural Overview

FIG. 1 is a block diagram that depicts an example system for automated data collection and analysis according to one embodiment of the invention.

A user machine 101 is communicatively coupled to a network 130 and devices 191A, 191B. A customer service engineer machine 141 and a provider server 161 also are communicatively coupled to network 130 and to one another. In various embodiments, the network 130 is a wireless network, dial up access, the Internet, a LAN, a WAN, or any other communication network.

User machine 101, customer service engineer (CSE) machine 141, devices 191A, 191B, and provider server 161 are each logical machines. Each logical machine can run on separate physical computing machines or can be running on the same physical computing machine as one or more of the other logical machines. Various embodiments of computers and other machines are described in detail below in the section entitled Hardware Overview. In various embodiments, devices 191A, 191B are routers, switches, hubs, and any other appropriate networking or computing devices.

User machine 101 comprises a launcher module 110 and an email client module 120A. In one embodiment, the launcher module 110 is one or more software elements running on the user machine 101. In various embodiments, the launcher module 110 is written in Java, Perl, C++, FORTRAN, Pascal, or any other appropriate language. In various embodiments, the launcher module 110 is Java Web Start™, an application that can execute Java Network Launching Protocol™ ("JNLP") files, a proprietary launcher application, or any other appropriate launcher mechanism. In various embodiments, the launcher module 110 can execute sets of commands including data capture commands, send and receive commands using appropriate communication mechanisms, or commands to make the launcher module 110 pause for a predefined period of time.

In one embodiment, the launcher module 110 comprises a command runner module 115. In various related embodiments, the command runner module 115 is a program running on the user machine 101 as part of the launcher module 110 or separately from the launcher module 110. In various embodiments, the command runner module 115 is written in Java, Perl, C++, FORTRAN, Pascal, or any other appropriate language. In various embodiments, the command runner module 115 is a Java Web Start™ application, an application that can execute JNLP files, an application that started by executing a JNLP file, a proprietary command running application, or any other appropriate command running mechanism. In various embodiments, the command runner module 115 executes sets of commands including data capture commands, send and receive commands using appropriate communication mechanisms, or commands to make the command runner module 115 pause for a predefined period of time.

In one embodiment, the email client modules 120A, 120B are programs that can send and receive email using appropriate communication means. In various embodiments, the email client modules 120A, 120B are programs that can render email documents written as unformatted text or in a structured format such as hypertext markup language (HTML), extensible markup language (XML), portable document format (PDF), or postscript (PS).

The user machine 101 is communicatively coupled to one or more devices 191A and 191B. In various embodiments, information is gathered from device 191A or 191B. In various embodiments, the communicative coupling between the user machine 101 and the devices 191A, 1911B is performed by a network such as a wireless network, dial up access, the Internet, a local area network (LAN), wide area network (WAN), or any other communication mechanism. In various embodiments, the communicative coupling between the user machine 101 and the devices 191A, 1911B is performed by a direct connection such as a cable, infrared connection, or other carrier medium. Similarly, in various embodiments, the communicative coupling between the CSE machine 141 and provider server 161 is performed by a wireless network, dial up access, the Internet, a LAN, a WAN, or any other communication mechanism.

The CSE machine 141 comprises a data capture command generator module 150 and an email client module 120B. Various embodiments of the email client module 120B are described above. In various embodiments, the data capture command generator module 150 is a program running on the CSE machine 141, a program running on a machine communicatively coupled to the CSE machine 141, or a module running as part of a program which is running either on the CSE machine 141 or a machine thereto communicatively coupled.

The provider server 161 comprises an analysis engine module 170 and an application download server module 180. In various embodiments, the analysis engine module 170 is a program running on the provider server 161, a program running on a machine communicatively coupled to the provider server 161, or a module running in a program which is running on the provider server 161 or a machine thereto communicatively coupled. In various embodiments, the analysis engine module 170 is an expert system, a rule-based engine, a rule-based markup language (RBML) engine, or any other appropriate analysis engine. RBML techniques are described in detail in Sinclair.

In various embodiments, the application download server module 180 is a program running on the provider server 161, a program running on a machine communicatively coupled to the provider server 161, or a subroutine running in a program which is running on the provider server 161 or a machine thereto communicatively coupled. In various embodiments, the download engine module 180 includes a file transfer protocol (FTP) server, a hypertext transfer protocol (HTTP) server, a secure HTTP (HTTPS) server, a TCP/IP socket, or any other appropriate communication mechanism.

3.0 Functional Overview

Figure 2:
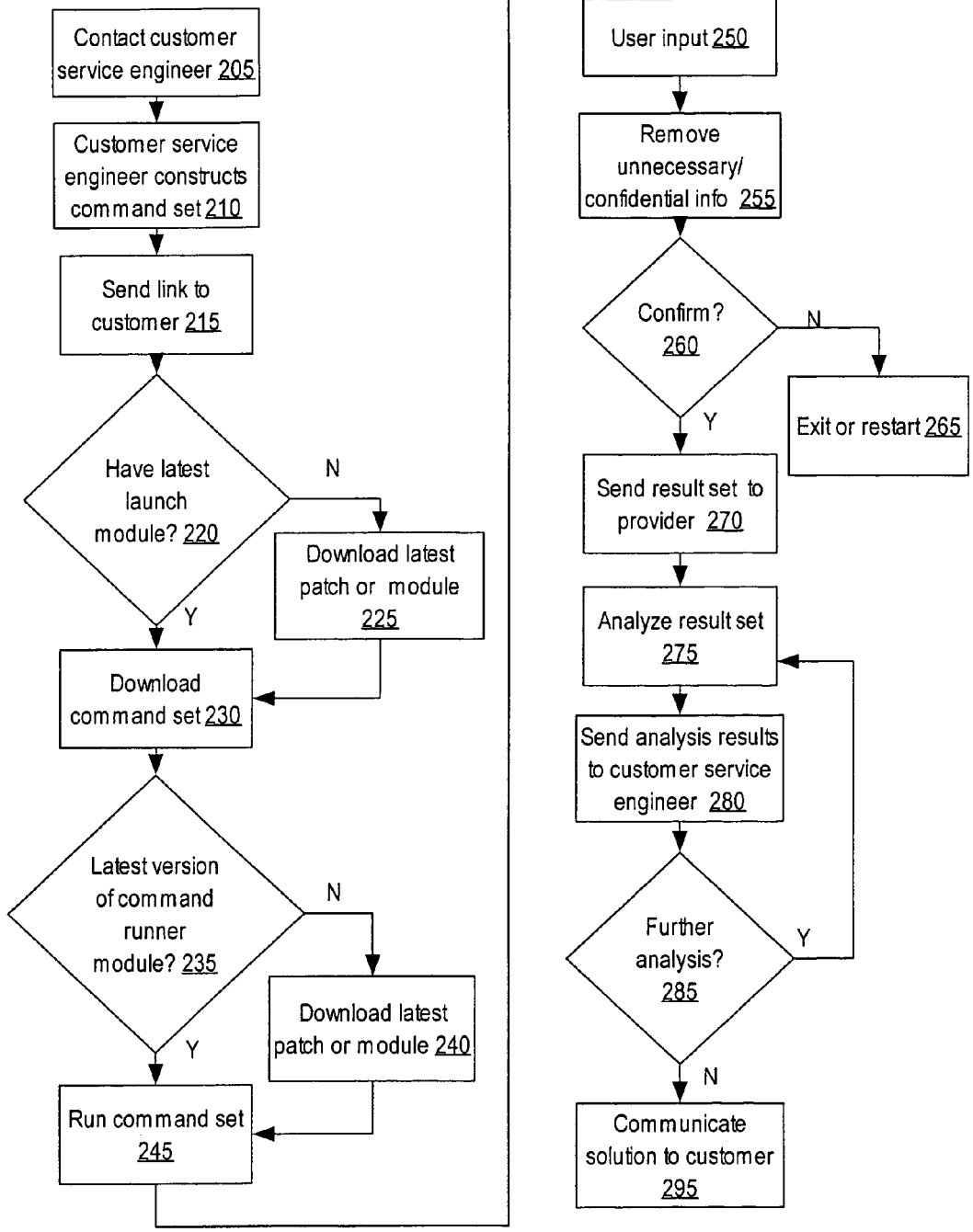
FIG. 2 is a flowchart that depicts a process for automated data collection and analysis according to one embodiment of the invention.

FIG. 2 is a flowchart that depicts a process for automated data collection and analysis according to one embodiment of the invention.

First a user contacts a CSE in step 205. For example, in the context of FIG. 1, an individual associated with user machine 101, such as a network administrator, contacts an individual associated with CSE machine 141, such as a CSE of a vendor of devices 191A, 191B. In various embodiments, the communication between the CSE and the user is accomplished in person, over the phone, via fax, via email, via instant messenger, by submitting the problem to a website such as through a trouble ticket system, or via any other appropriate communication mechanism. In one embodiment, the user describes a problem with one or more devices to the CSE. In various embodiments, the user sends system diagrams, configuration files, log files, or any other appropriate information to the CSE. For example, in the context of FIG. 1, a user using a user machine 101 uses an email client module 120A to email a description of a problem with the device 191A to a CSE. The CSE receives the email via an email client module 120B.

From the information provided by the user, the CSE constructs a command set in step 210. In various embodiments, the command set is constructed automatically based on a problem the CSE has previously identified, named and stored in association with pre-defined commands, or is constructed manually by the CSE, or is constructed automatically based on the user, the device, or the information sent by the user in step 205. In a related embodiment, the CSE selects a predefined set of commands based on a problem identified on the device, where the set of commands is known to collect data necessary to diagnose the problem identified in the device. For example, in the context of FIG. 1, the CSE uses a data capture command generator module 150 to construct a set of commands to be executed by the user using the command runner module 115 in order to capture data from a devices 191A, 191B and one or more of the commands are selected because that are known to diagnose a problem identified on device 191A.

The command set may comprise one or more commands of any form that can collect information from devices 191A, 191B. In various embodiments, the command set comprises a series of instructions in Simple Network Management Protocol (SNMP); a command-line interface (CLI) language compatible with devices 191A, 191B; XML; or any other appropriate format. In various embodiments, the command set includes commands to be executed on the devices, email address or other contact mechanism for the user, a unique identifier to identify the particular problem being worked on for the particular user, a security key, a user account name, CSE email address or other communication mechanism usable to contact the CSE, user name of CSE, or any other appropriate information or source code or executable module.

The user is then sent a link to the command set in step 215. In various embodiments, the CSE causes the link to be emailed, faxed, communicated over the phone, sent via an electronic chat mechanism, or communicated to the user via any appropriate mechanism. In various embodiments, the link is a universal resource locator (URL) or any other appropriate link or reference mechanism. For example, in the context of FIG. 1, the CSE sends a URL to a user as part of an email sent from the email client module 120B to the email client module 120A.

After receiving the link, the user selects the link, which causes a check to be performed to determine whether the user has the latest launcher module in step 220. Selecting the link causes a user machine to invoke one or more software elements that perform further steps as shown in FIG. 2. For example, in the context of FIG. 1, a user associated with a user machine 101 selects a link. Selecting the link causes a process on the user machine 101 to check the latest version of the launcher module 110 by communicating with the provider server 161 and obtaining the version of the latest module 110. The latest version number is then compared to the version number of the local launcher module 110 to determine whether the local launcher module 110 is the latest.

In one embodiment, selecting the link comprises enacting security measures. In various related embodiments, the security measures include requiring the user to input a username and password, security credentials, or other security mechanism. In various embodiments, selecting the link comprises clicking or double-clicking on the link or otherwise providing the link to an appropriate application. In various embodiments, the check is performed by the user or is automatically performed by an application invoked by selecting the link. In one embodiment, checking for the latest version of the launcher module comprises the user downloading and installing the launcher module. For example, in the context of FIG. 1, a user selects a particular URL in an email by double-clicking the URL. Double-clicking the particular URL causes a username box to appear. The user types a username into the box. Double-clicking the link also causes a check to be performed by the launcher module to see if the user machine has the latest version of the launcher module.

If the user machine does not have the latest version of the application, then the latest version of the launcher module is downloaded in step 225. In various embodiments, the download of the latest launcher module or any other download described by these techniques are performed via hypertext transfer protocol HTTP, HTTPS, FTP, rsync, transport communication protocol/internet protocol (TCP/IP) sockets, or any other appropriate mechanism. In various embodiments, downloading the latest version of the launcher module comprises downloading the entire launcher module or downloading a patch to the existing launcher module. For example, in the context of FIG. 1, the latest version of a Java Web Start launcher module 110 is downloaded from a third party Internet server that hosts the launcher module, such as java.sun.com, using HTTP.

If the user has downloaded the latest version of the launcher module or the user already had the latest version of the launcher module, then the user downloads the command set in step 230. In one embodiment, downloading the command set comprises enacting security measures. In various related embodiments, the security measures include requiring, before downloading the command set, the user to input a username and password, security credentials, or other security mechanism. An example downloading process is described above. The content of the command set is described in detail in step 245 below. For example, in the context of FIG. 1, the user inputs a username and password in order to access the command set and then downloads the command set using FTP.

In one embodiment, a command runner module, such as command runner module 115 of FIG. 1, running within the launcher module is used to execute the command set. In another embodiment, the launcher module executes the command set. In the embodiment where a command runner module is used to execute the commands, then, in step 235 a check is made to determine whether the latest version of the command runner module is present. In one embodiment, the check to determine whether the command runner module is the latest version is performed by comparing a version number of the resident command runner module to a version number known to be the latest. In related embodiments, the version number known to be the latest is obtained by downloading the version number known to be the latest from a reliable source for the version number known to be the latest, where the reliable source for the version number known to be the latest is a web service, a website, an application communicating on a TCP/IP port, an FTP server, a rsync directory, HTTP or HTTPS locations, or any other appropriate authority. For example, in the context of FIG. 1, the latest version number is obtained by querying a web service running on the provider server 161.

If the latest version of the command runner module is not present, then in step 240 the latest version of the command runner module is downloaded. In various embodiments, the download of the command runner module is performed by the means and mechanisms described above. In various embodiments, downloading the latest version of the command runner module comprises downloading the entire command runner module or downloading a patch to the existing command runner module. For example, in the context of FIG. 1, the latest version of the command runner module 115 is downloaded from the application download server module 180 using FTP.

Once the latest version of the command runner module is obtained either by downloading it (step 240) or if it already exists (from step 235), then the command set is run in step 245. In various embodiments, the command set comprises commands to collect data from one or more devices. In various embodiments, the command set comprises one or more commands, each of which can be executed one or more times on one or more devices with one or more delays. In various embodiments, running the commands comprises the command runner module or the launcher module executing the command set to perform the one or more commands. In various embodiments, the command set causes the command runner module or the launcher module to collect data from one or more devices. In various embodiments, the results of the commands are stored in memory communicatively coupled to the user machine, on a machine-readable medium, or via any other appropriate mechanism. In various embodiments, the result set is formatted in HTML, XML, or any other appropriate format. For example, in the context of FIG. 1, the command set is executed by the command runner module 115, data is collected form devices 191A, 1911B, and an XML file of results is produced.

If needed, user input can be collected in step 250. In various embodiments, user input includes identification of devices on which to run the command set, username and password for one or more devices, or any other appropriate information. For example, in the context of FIG. 1, the user types in an IP address, username, and password for each of devices 191A, 191B into a window spawned by the command runner module 115.

Once the command set has been run, confidential or unnecessary information can be removed from the result set of the commands in step 255. In various embodiments, user names, passwords, IP addresses, security keys, and any other appropriate confidential or unnecessary information is striped from the result set. In various embodiments, stripping information from the result set comprises removing the unnecessary or confidential information from the memory or machine-readable medium containing the result set, making a copy of the result set excluding the unnecessary or confidential information, or any other appropriate means of removing the unnecessary or confidential information. For example, in the context of FIG. 1, the command runner module 115 removes from the result set one or more usernames, passwords, IP addresses and any other confidential or unnecessary information.

In one embodiment, after removing the unnecessary or confidential information in step 255, the result set is sent to a provider server without confirming the data (step 270). In another embodiment, the result set is confirmed in step 260 before it can be sent to the provider server. In various embodiments, confirming the data comprises checking the data for accuracy, to ensure that no unnecessary or confidential information is included, for completeness, or any other appropriate check. In various related embodiments, the data is checked by an automatic process, by the user, or by the CSE. In various embodiments, confirming the data comprises selecting a button, allowing an opt-out mechanism to time out, or any other appropriate confirmation means. For example, in the context of FIG. 1, the command runner module 115 provides the user with a view of the result set and the user confirms that this information should be sent to the analysis engine module 170 by selecting a button on the command runner module's 115 user interface.

If the result set is not confirmed in step 260, then in step 265 the user can exit or restart the process of automated data collection and analysis. In one embodiment, if the user exits the process of automated data collection and analysis, then the result set is stored in memory and can be retrieved later. In various embodiments, if the process is restarted, then the CSE is contacted (step 205), the CSE constructs the command set (step 210), a link is sent to the customer (step 215), the command set is run (step 245), user input is given (step 250), information is removed (step 255), or any other appropriate step 220, 225, 230, 235, 240, or 260 is performed. For example, in the context of FIG. 1, the user decides not to pursue the advise of the CSE, cancels the result set by selecting a button on the command runner module's 115 user interface, and no further action is taken.

If the result set is confirmed in step 260, then the result set is sent to the provider server in step 270. In various embodiments, the result set is sent to the provider server via email, by uploading it to a website, via TCP/IP sockets, or using FTP, rsync, HTTP, HTTPS or any other appropriate mechanism. For example, in the context of FIG. 1, the result set is sent to the analysis engine module 170 via FTP.

The result set is analyzed in step 275. In various embodiments, the result set is analyzed manually by the CSE or other human operator or is analyzed automatically by the provider server. In various embodiments, analyzing the result set comprises analyzing the result set using a rule-based system, an expert system, a neural network, or any other appropriate analysis mechanism. In various embodiments, analyzing the result set using a rule-based system comprises comparing the result set to one or more rules that describe what should or should not have occurred. In various embodiments, the rules are based on the identified problems, result set, command set, device, desired configuration, or any other appropriate information. In various embodiments, the analysis results comprise identifications of items in the result set that do not obey, do obey, or are indeterminate with respect to rules in the rule-based system. In various embodiments, the analysis results are formatted in HTML, XML, or any other appropriate format. In one embodiment, the techniques of Sinclair are used. For example, in the context of FIG. 1, the result set is automatically analyzed in the analysis engine module 170 using the techniques disclosed in Sinclair.

Once the analysis is performed in step 275, the analysis results are made available to the CSE in step 280. In various embodiments, analysis results are sent to the CSE via email, by uploading it to a website, updating information in a trouble ticket system, via TCP/IP sockets, or using FTP, rsync, HTTP, HTTPS or any other appropriate mechanism. For example, in the context of FIG. 1, analysis results are sent via email from the analysis engine module 170 to the CSE.

After receiving the analysis results, the CSE determines if any further analysis is needed in step 285. In various embodiments, determining whether further analysis is needed comprises determining whether solutions have been provided for all problems determined for the devices, the analysis has detected all problems with the devices, or any other appropriate means for determining whether further analysis is needed. In various embodiments, the CSE or an automated process determines whether further analysis is needed. If further analysis is needed, then further analysis is performed in step 275. For example, in the context of FIG. 1, the CSE determines, by looking at the analysis results, that there are numerous unresolved problems from the result set and performs manual analysis of the result set.

If further analysis is not needed, then solutions are communicated to the user in step 295. In one embodiment, the solutions are determined by the provider server based on the problems detected. In various embodiments, the solutions provided to the customer are command-line commands executable at the user machine or on a device, are human-readable instructions that indicate solutions to specific problems, configuration files designed to overcome certain problems, commands to add to configuration files, or any other appropriate solutions. In various embodiments, the solutions are provided to the user via a machine-readable medium, by enabling them to download information from a link, by sending the solution or a link to the solution via email, HTTP, HTTPS, rsync, FTP, or any other appropriate communication means. In various embodiments, the solutions are human-readable or are in a proprietary format, HTML, XML, RBML, or any other appropriate format. For example, in the context of FIG. 1, the CSE determines that no further analysis is needed and the solutions are sent to the user via email client module 120B.

Various embodiments of FIG. 2 provide techniques for automated data collection and analysis that do not require a CSE to connect to a device; do not require user expertise in connecting to and collecting data from the device; do not require the user diligence and expertise in order to collect the correct data at the precise intervals needed; and do not constrain the solution of device problems to the knowledge and available time of a particular CSE.

Whereas FIG. 2 depicts a certain flow of events, the invention is not limited to these steps or this flow. Additional steps could be performed, steps could be left out, and the steps could be performed in parallel or in a different order.

4.0 Hardware Overview

Figure 3:
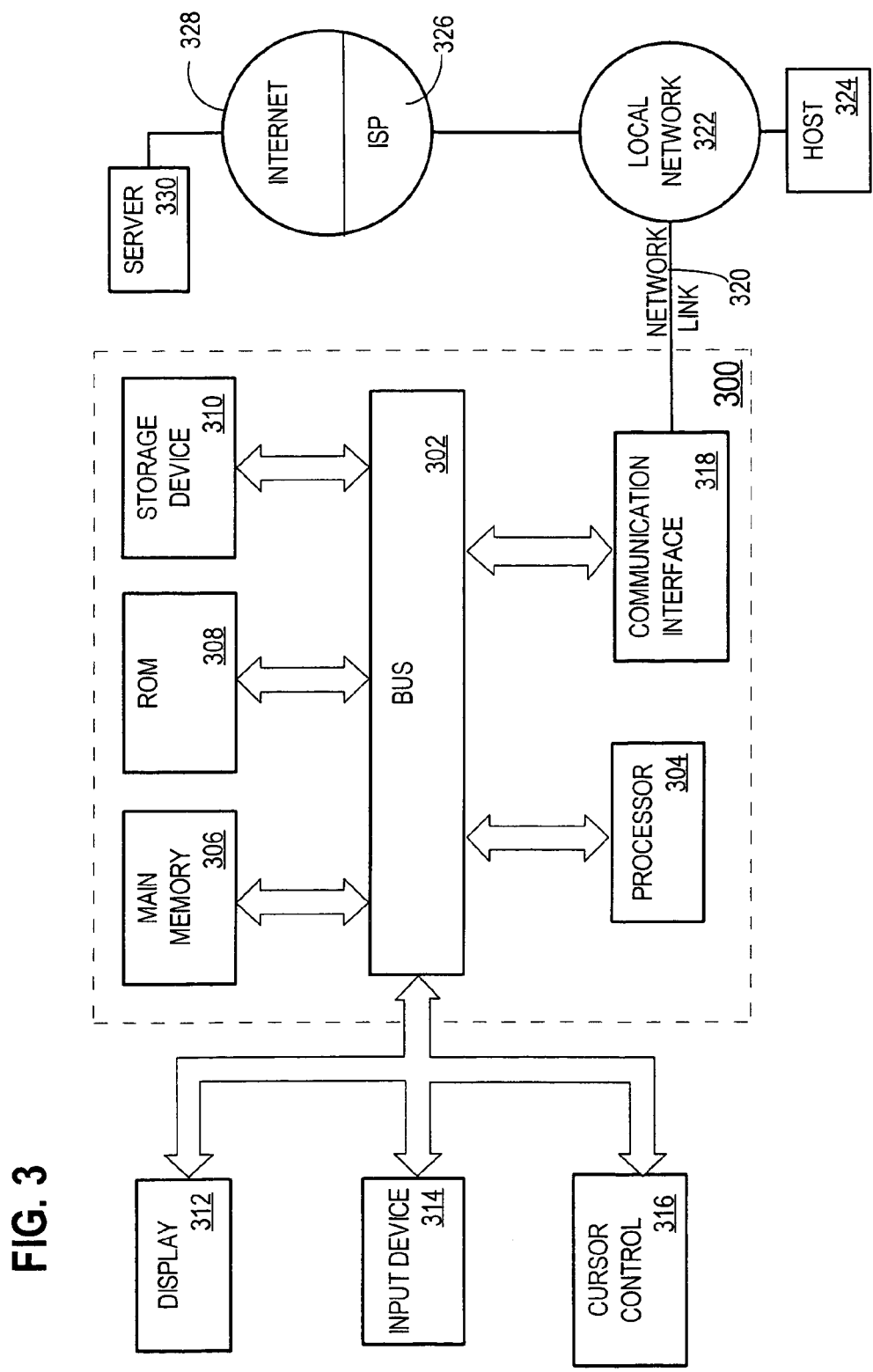
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infrared data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of automated data collection and analysis, the method comprising the steps of:

receiving a request with information about a device, wherein the device is a network element configured for receiving packets and transmitting the packets in a packet-switched network;
constructing a command set, wherein the command set is a set of executable commands that indicate collection of data from the device and zero or more other devices;
sending a link referencing the command set to a computer associated with the device;
wherein at the computer associated with the device:
the command set that is referenced in the link is downloaded based on following the link;
a command runner module executes the downloaded command set;
a set of results is received from the device; and
a modified result set is created by removing one or more confidential data elements from the set of results;
receiving the modified result set;
providing the modified result set to a provider server that comprises an analysis engine;
receiving analysis results from the analysis engine, wherein the analysis results are based at least in part on the modified result set; and
determining a set of solutions based on the analysis results.

2. The method of claim 1, wherein the command set comprises one or more commands to collect data from two or more devices simultaneously.

3. The method of claim 1, wherein the command set comprises a first command to collect data from the device at a first time, and a second command to collect data from the device at a second time, wherein the first time is different from the second time.

4. The method of claim 1, wherein the set of results is based at least in part on the execution of the command set.

5. The method of claim 1, further comprising the step of providing the set of solutions to a user.

6. The method of claim 1, wherein the step of constructing the command set comprises choosing one or more commands from a list of predefined commands.

7. The method of claim 6, wherein the step of choosing one or more commands from the list of predefined commands comprises automatically choosing one or more commands based at least in part on the information about the device in the request.

8. The method of claim 1, wherein the step of constructing the command set comprises receiving input from a user, wherein the input defines new commands based on the request with information about the device.

9. A method for automated data collection from a network device and data analysis, the method comprising the steps of:
receiving a request with information about the network device;
constructing a command set, wherein the command set is a set of executable commands that indicate collection of data from the network device and zero or more other network devices;
sending a link referencing the command set to a computer associated with the network device;
wherein at the computer associated with the network device:
the command set that is referenced in the link is downloaded based on following the link;
a command runner module executes the downloaded command set;
a set of results is received from the network device; and
a modified result set is created by removing one or more confidential data elements from the set of results;
receiving the modified result set;
providing the modified result set to a provider server that comprises an analysis engine;
receiving analysis results from the analysis engine, wherein the analysis results are based at least in part on the modified result set; and
determining a set of solutions based on the analysis results.

10. An apparatus for automated data collection and analysis, comprising:
means for receiving a request with information about a device, wherein the device is a network element configured for receiving packets and transmitting the packets in a packet-switched network;
means for constructing a command set, wherein the command set is a set of executable commands that indicate collection of data from the device and zero or more other devices;
means for sending a link referencing the command set to a computer associated with the device;
wherein at the computer associated with the device:
the command set that is referenced in the link is downloaded based on following the link;
a command runner module executes the downloaded command set;
a set of results is received from the device; and
a modified result set is created by removing one or more confidential data elements from the set of results;
means for receiving the modified result set;
means for providing the modified result set to a provider server that comprises an analysis engine;
means for receiving analysis results from the analysis engine, wherein the analysis results are based at least in part on the modified result set; and
means for determining a set of solutions based on the analysis results.

11. The apparatus of claim 10, wherein the command set comprises one or more commands to collect data from two or more devices simultaneously.

12. The apparatus of claim 10, wherein the command set comprises a first command to collect data from the device at a first time, and a second command to collect data from the device at a second time, wherein the first time is different from the second time.

13. The apparatus of claim 10, wherein the set of results is based at least in part on the execution of the command set.

14. The apparatus of claim 10, further comprising means for providing the set of solutions to a user.

15. The apparatus of claim 10, wherein the means for constructing the command set comprise means for choosing one or more commands from a list of predefined commands.

16. The apparatus of claim 15, wherein the means for choosing one or more commands from the list of predefined commands comprise means for automatically choosing one or more commands based at least in part on the information about the device in the request.

17. The apparatus of claim 10, wherein the means for constructing the command set comprise means for receiving input from a user, wherein the input defines new commands based on the request with information about the device.

* * * * *